(12) United States Patent
Chiu et al.

(10) Patent No.: US 7,402,988 B2
(45) Date of Patent: Jul. 22, 2008

(54) SWITCHING REGULATOR

(75) Inventors: Pao-Cheng Chiu, Hsin Tien (TW); Chieh-Min Feng, Chu Tung Town (TW); Ming-Han Lee, Hsin Tien (TW)

(73) Assignee: Realtek Semiconductor Corp., Hsinchu (TW)

( * ) Notice: Subject to any disclaimer, the term of this patent is extended or adjusted under 35 U.S.C. 154(b) by 100 days.

(21) Appl. No.: 11/360,687

(22) Filed: Feb. 24, 2006

(65) Prior Publication Data

US 2006/0197516 A1 Sep. 7, 2006

(30) Foreign Application Priority Data

Mar. 1, 2005 (TW) .............................. 94106044 A

(51) Int. Cl.
*G05F 1/24* (2006.01)

(52) U.S. Cl. .................... 323/283; 323/284; 323/351

(58) Field of Classification Search ......... 323/281–285, 323/351

See application file for complete search history.

(56) References Cited

U.S. PATENT DOCUMENTS

| | | | | |
|---|---|---|---|---|
| 5,260,643 A * | 11/1993 | Sandhu | ........................ | 323/225 |
| 5,594,631 A * | 1/1997 | Katoozi et al. | ................. | 363/41 |
| 5,905,370 A * | 5/1999 | Bryson | ........................ | 323/283 |
| 6,147,848 A * | 11/2000 | Boggs et al. | ................ | 361/93.2 |
| 6,204,651 B1 * | 3/2001 | Marcus et al. | ............... | 323/283 |
| 6,271,650 B1 * | 8/2001 | Massie et al. | ................ | 323/272 |
| 6,369,557 B1 * | 4/2002 | Agiman | ...................... | 323/282 |
| 6,430,070 B1 * | 8/2002 | Shi et al. | ....................... | 363/97 |
| 6,680,604 B2 * | 1/2004 | Muratov et al. | ............. | 323/285 |
| 6,933,710 B2 * | 8/2005 | Shieh | ......................... | 323/282 |
| 7,053,594 B2 * | 5/2006 | Sutardja et al. | ............. | 323/283 |
| 7,199,568 B2 * | 4/2007 | Matsuo et al. | .............. | 323/283 |
| 7,221,131 B2 * | 5/2007 | Ozawa et al. | ............... | 323/272 |
| 2002/0097032 A1 * | 7/2002 | Inaba | ......................... | 323/283 |
| 2004/0090217 A1 * | 5/2004 | Muratov et al. | ............. | 323/282 |
| 2004/0207375 A1 * | 10/2004 | Umemoto et al. | ........... | 323/282 |
| 2006/0139017 A1 * | 6/2006 | Peiffer et al. | ................ | 323/282 |
| 2007/0075697 A1 * | 4/2007 | Shimizu et al. | ............. | 323/282 |

OTHER PUBLICATIONS

Abraham I. Pressman, 1.3 "Buck" Switching Regulator Topology, 1.3.1 Basic Operation, Switching Power Supply Design, 9-12, 2nd edition, McGraw-Hill, c1999.

* cited by examiner

*Primary Examiner*—Jeffrey L. Sterrett
*Assistant Examiner*—Stuart Hansen
(74) *Attorney, Agent, or Firm*—Muncy, Geissler, Olds & Lowe, PLLC

(57) ABSTRACT

A switching regulator includes a reference voltage generator and a switching-regulating module. The reference voltage generator receives a digital control signal and generates a reference voltage according to the digital control signal. The switching-regulating module is connected to the reference voltage generator and generates an output voltage according to the reference voltage. The value of the digital control signal is gradually increased to make the reference voltage being gradually increased at the initial stage of the activation of the switching regulator.

14 Claims, 5 Drawing Sheets

SWITCHING REGULATOR

This application claims the benefit of the filing date of Taiwan Application Ser. No. 094106044, filed on Mar. 1, 2005, the content of which is incorporated herein by reference.

BACKGROUND OF THE INVENTION (a) Field of the Invention

The invention relates to a voltage regulation device, particularly to a switching regulator.

(b) Description of the Related Art

Typically a switching regulator is a control circuit for maintaining an output voltage of the switching regulator a setting value, where the setting value is a reference voltage Vref of a circuit. When the circuit is powered on, the switching regulator provides the reference voltage Vref of a voltage level slowly increasing to a required voltage value. If the reference voltage Vref of a constant voltage level is immediately fed into the circuit when the circuit is powered on, a considerable sink current will occur at both the input and the output parts of the circuit. Though the sink current may not permanently damage the circuit or an off-chip device, it may affect their characteristics such as stability or duration. Therefore, to slowly increase the reference voltage is very important for the switching regulator when the system is powered on.

FIG. 1 shows the circuit structure of a typical switching regulator. Referring to FIG. 1, the switching regulator 100 is used to generate an output voltage Vout identical to the reference voltage Vref. The switching regulator 100 includes an EA (error amplifier) 102, a pulse-width modulator 104, a gate driver 106, a switching circuit 108, an inductor 110, and a capacitor 112. The error amplifier 102 receives the reference voltage Vref as well as the output voltage Vout and generates an error voltage signal. The pulse-width modulator 104 receives the error voltage signal as well as a periodic signal (such as a sawtooth clock) and generates a pulse-width modulation signal (such as a square clock). The gate driver 106 receives the pulse-width modulation signal of the pulse-width modulator 104 and generates a switch control signal. The switching circuit 108 receives the switch control signal and output a current signal. The switching circuit 108 includes two transistor switches SW1 and SW2, and their gates are controlled by the switch control signal. The inductor 110 and the capacitor 112 receive the current signal and generate the output voltage Vout.

The switching regulator compares the output voltage Vout with the reference voltage Vref to control the switches SW1 and SW2 of the switching circuit 108, so that a steady output voltage Vout is supplied. When the circuit is powered on, the output voltage Vout is 0 in the beginning, and then the output voltage is gradually increased to a steady voltage level. The operation of a switching regulator is conventional thus the detail description is omitted. The further detail is described in section 1.3.1 of the book entitled "Switching Power supply design" (2nd, Abraham I. Pressman).

When the switching regulator is powered on and the reference voltage Vref equals a preset output voltage, the considerable voltage difference will make the switch SW1 keep conducting to result in an abnormal enormous current flowing through switch devices and the system output. To avoid this problem, when the switching regulator is powered on, the reference voltage Vref must be increased slowly.

Generally, to slowly increase the reference voltage Vref is referred to as "soft start", where a soft start circuit is utilized to generate the reference voltage Vref with gradual increases. FIG. 2 shows a schematic diagram illustrating a conventional soft-start circuit 200 in connection with the switching regulator 100. Referring to FIG. 2, the reference voltage Vref is increased gradually since the capacitor C1 outside the chip is charged. However, the method requires an additional pin, a large capacitor C1 outside the chip, and off-chip resistors R1 and R2.

When the soft start circuit is powered on, a constant current Ich is utilized to charge the off-chip capacitor C1 so that the reference voltage Vref is increased gradually at the pin SlowST and the pin Vrefb. When the voltage of the off-chip capacitor C1 reaches a preset value, the reference voltage Vref stays at a fixed voltage level generated by the constant current Ich and the off-chip resistors R1 and R2. However, after the reference voltage Vref reaches the preset value, to maintain the reference voltage Vref, an additional switch is needed to switch the original voltage source to another steady voltage source because the off-chip capacitor fails to be accurately controlled. Furthermore, the constant current Ich is adjustable to maintain the reference voltage accurately. Also, it is unfavorable to incorporate the capacitor C1 into the chip due to its off-chip capacitance.

BRIEF SUMMARY OF THE INVENTION

An object of the invention is to provide a method and a device for generating a reference voltage.

Another object of the invention is to provide a method and a device used in a switching regulation circuit for generating a reference voltage.

Another object of the invention is to provide a method and a device incorporated in a single chip and used in a switching regulation circuit for generating a reference voltage.

According to the invention, a switching regulator includes a reference voltage generator and a switching-regulating module. The reference voltage generator generates a reference voltage according to the digital control signal. The switching-regulating module is connected to the reference voltage generator and generates an output voltage according to the reference voltage.

A reference voltage generator for outputting a reference voltage to a switching regulator includes a logic control unit for generating a digital control signal, and a digital-to-analog converter connected to the logic control unit for generating the reference voltage according to the digital control signal.

According to the invention, a voltage regulation method for the switching regulator including the steps of generating a digital control signal; generating a reference voltage according to the digital control signal; comparing the reference voltage and an output voltage to generate a first comparison signal; comparing the first comparison signal and a periodic signal to generate a second comparison signal; generating a control signal according to the second comparison signal; and generating the output voltage according to the control signal.

DETAILED DESCRIPTION OF THE INVENTION

The switching regulator and the reference voltage generator according to the invention will be described with reference to the accompanying drawings.

Figure 1:
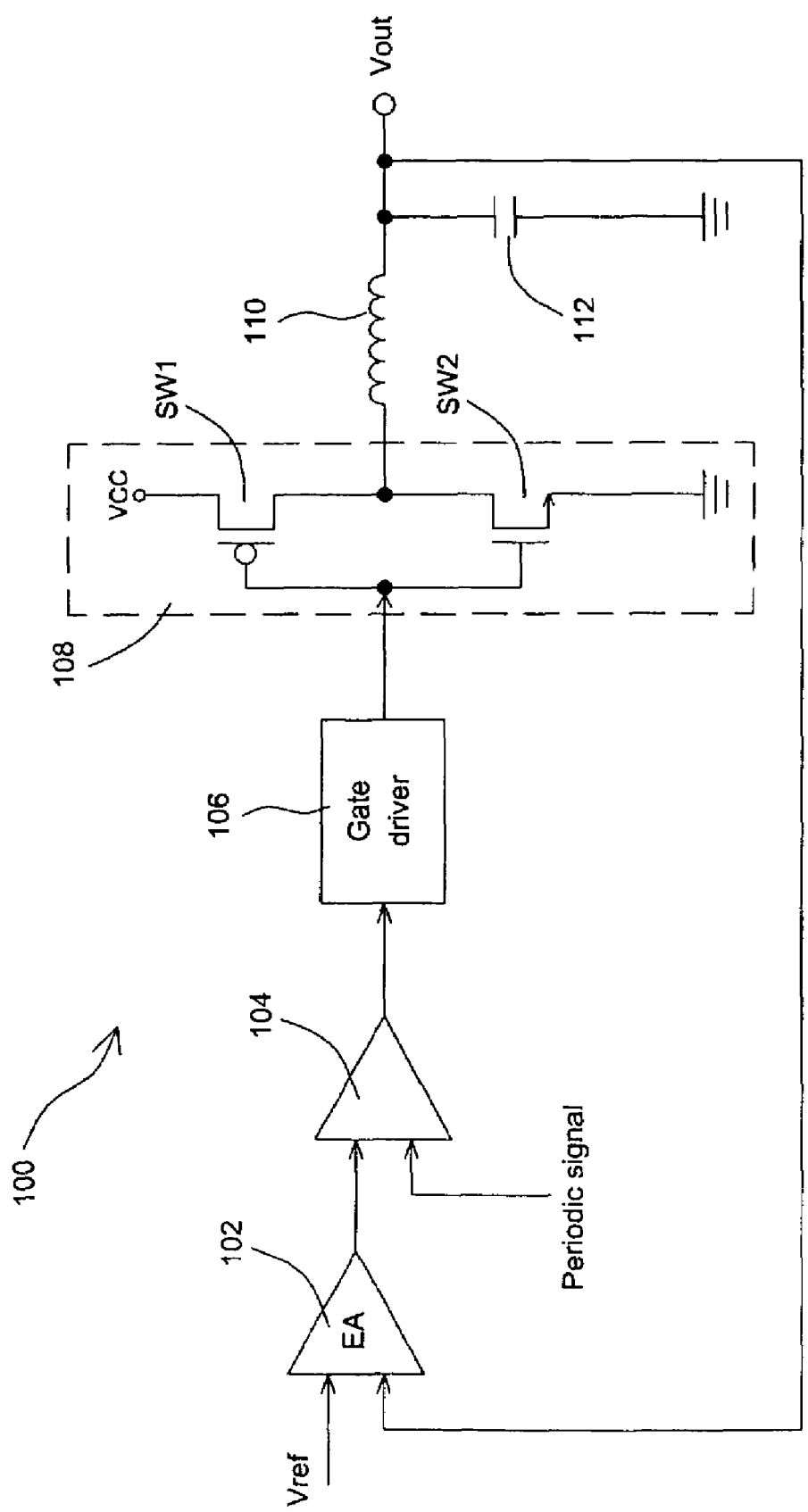
FIG. 1 shows the architecture of a conventional switching regulator.
Figure 2:
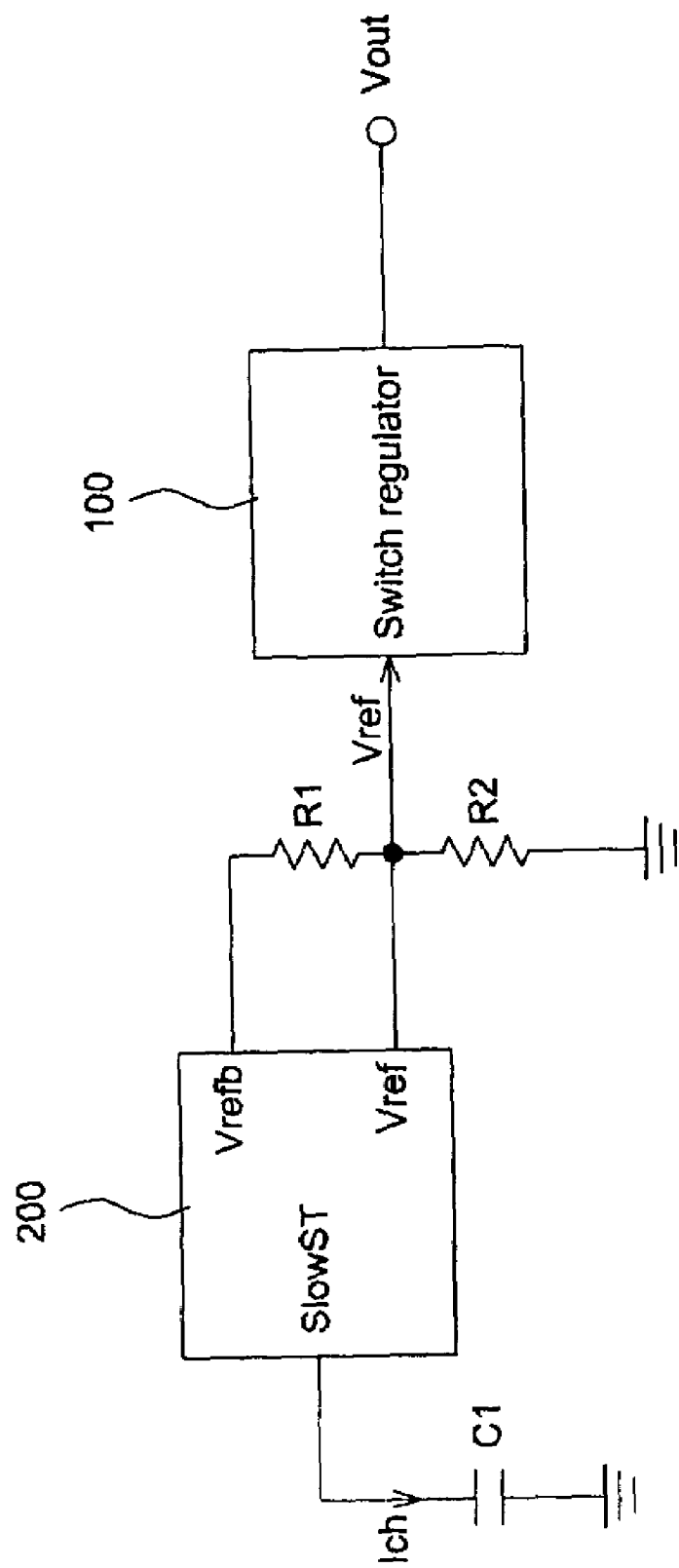
FIG. 2 shows a schematic diagram illustrating a conventional soft-start circuit in connection with a switching regulator 100.
Figure 3:
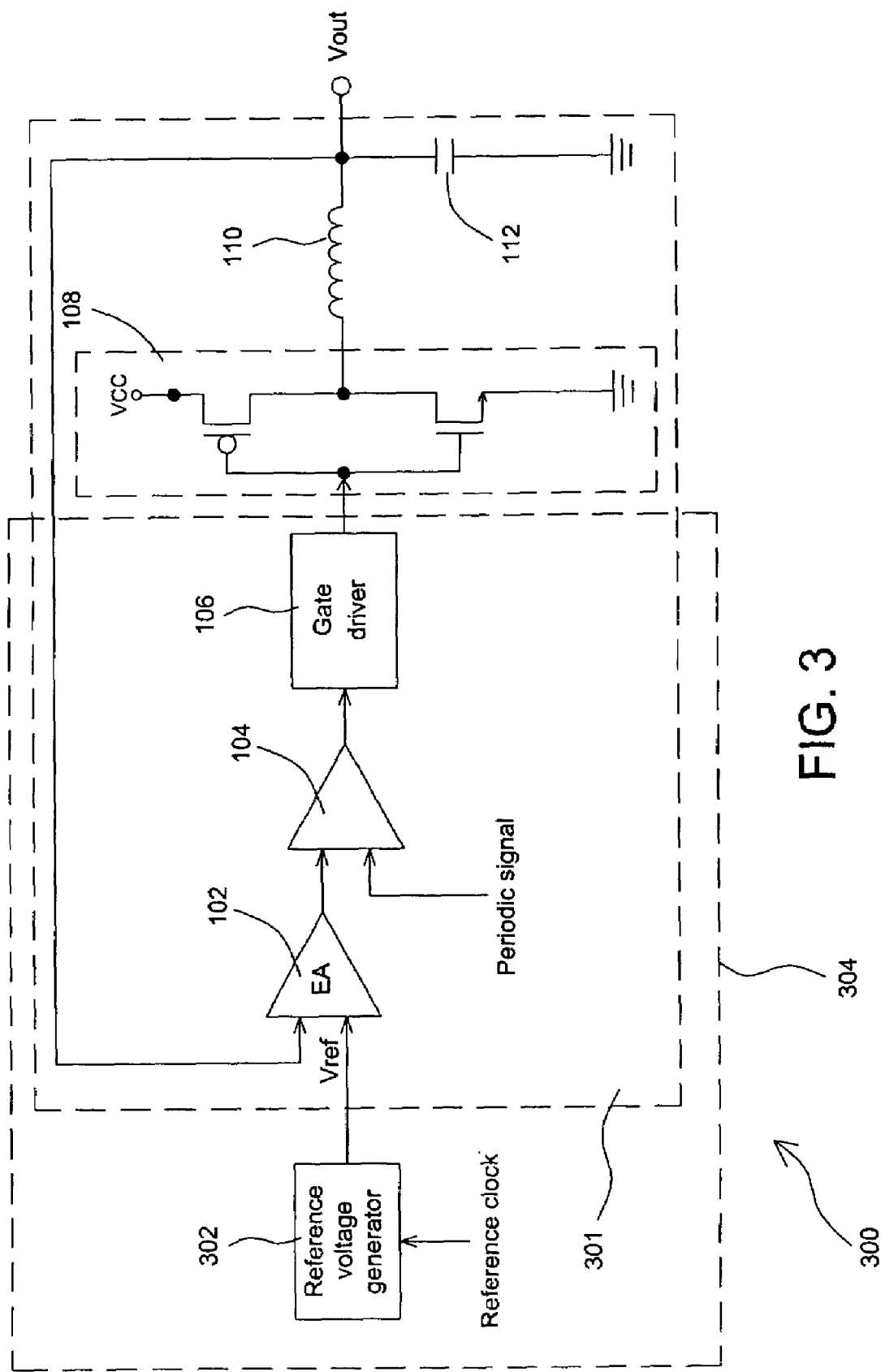
FIG. 3 shows a schematic view illustrating a switching regulator according to the present invention.

FIG. 3 shows a schematic view illustrating a switching regulator 300 according to the invention. The switching regulator 300 includes a switching-regulating module 301 and a reference voltage generator 302. The switching-regulating module 301 in this embodiment is similar to the conventional one shown in FIG. 1, each including an EA (error amplifier) 102, a pulse-width modulator 104, a gate driver 106, a switching circuit 108, an inductor 110, and a capacitor 112. The switching-regulating module 301 is well known for persons skilled in the art, and the scope of the present invention is not limited to the embodiment.

Referring to FIG. 3, the reference voltage generator 302 is used to provide a gradually increased reference voltage Vref to a system when the system is power on. The error amplifier 102, the pulse-width modulator 104, and the gate driver 106 are located within a control chip 304. Alternatively, the switching circuit 108 is also located within the control chip 304.

Figure 4:
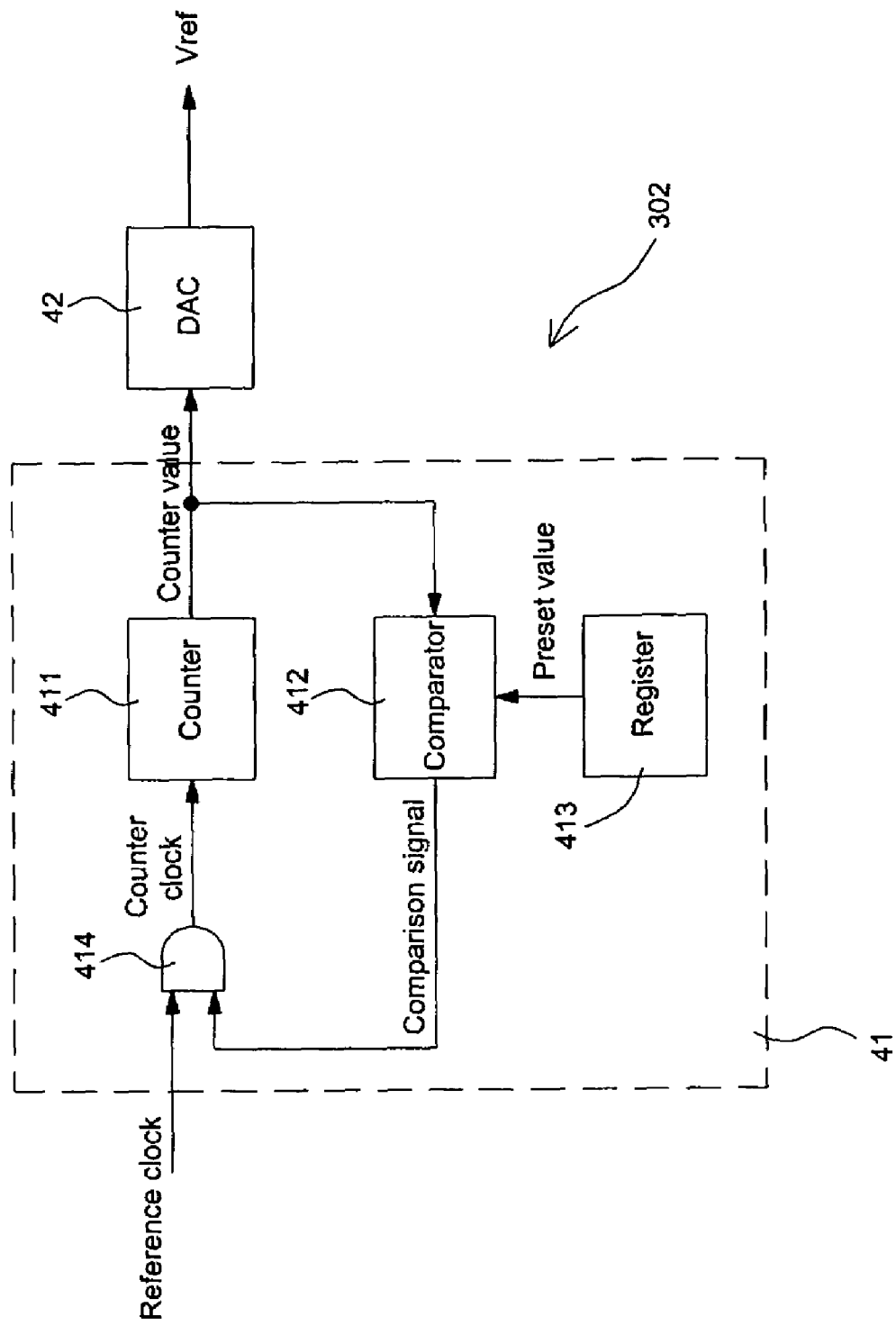
FIG. 4 shows a block diagram illustrating an embodiment of a reference voltage generator according to the present invention.

FIG. 4 shows a block diagram illustrating an embodiment of a reference voltage generator 302. Referring to FIG. 4, the reference voltage generator 302 includes a logic control unit 41 and a digital-to-analog converter (DAC) 42. The logic control unit 41 may be a finite state machine (FSM), and the logic control unit 41 includes a counter 411, a comparator 412, a register 413, and a logic gate 414. When the system is powered on, the logic control unit 41 provides the DAC 42 with an accumulated counting value at the initial stage of the system activation. Hence, the DAC 42 may generate a gradually increased reference voltage Vref at the initial stage of the system activation.

The counter 411 counts the pulse number of a counting clock and generates a counting value. The DAC 42 generates the reference voltage Vref according to the counting value. The comparator compares the counting value and a preset value to generate a comparison signal. If the preset value is stored in the register 413, the preset value may be updated by the system. When the counting value is larger than the preset value, the comparison signal is enabled. In this embodiment, the comparison signal will be a low-level signal when it is enabled. The logic gate 414 receives a reference clock as well as the comparison signal and generates the counting clock. When the comparison signal is not enabled, the counting clock equals the reference clock, and the level of the counting clock is periodically changed. When the comparison signal is enabled, the level of the counting clock stays at a fixed level. In this embodiment, an OR gate is utilized as an example of the logic gate 414. However, the implementation of logic gate 414 is not limited to the OR gate.

When the control chip 304 is powered on, the initial value of the counter 411, namely the counting value, is 0. Hence, the reference voltage Vref generated by the DAC 42 according to the counting value is 0V. The logic gate 414 outputs a counting clock with pulses, and then the counter 411 counts the pulse number of the counting clock to gradually increase the counting value. Therefore, the reference voltage Vref generated by the DAC 42 is gradually increased corresponding to the increment of the counting value. Finally, when the comparator 412 detects that the counting value is large than the preset value, the logic gate 414 outputs a signal with no pulse, such that the counting value is fixed at a specific value to make the reference voltage Vref stay at a desired level.

Hence, from FIG. 4, it can be seen that the counting value is gradually increased and then fixed at the preset value, and thereby the output voltage of the DAC 42 may also stay at a preset voltage level. Hence, as long as the control chip 304 is capable of providing the desired counting value, the logic control unit 41 can be omitted. In other words, in that case only the DAC 42 is needed for the reference voltage generator 302.

Figure 5:
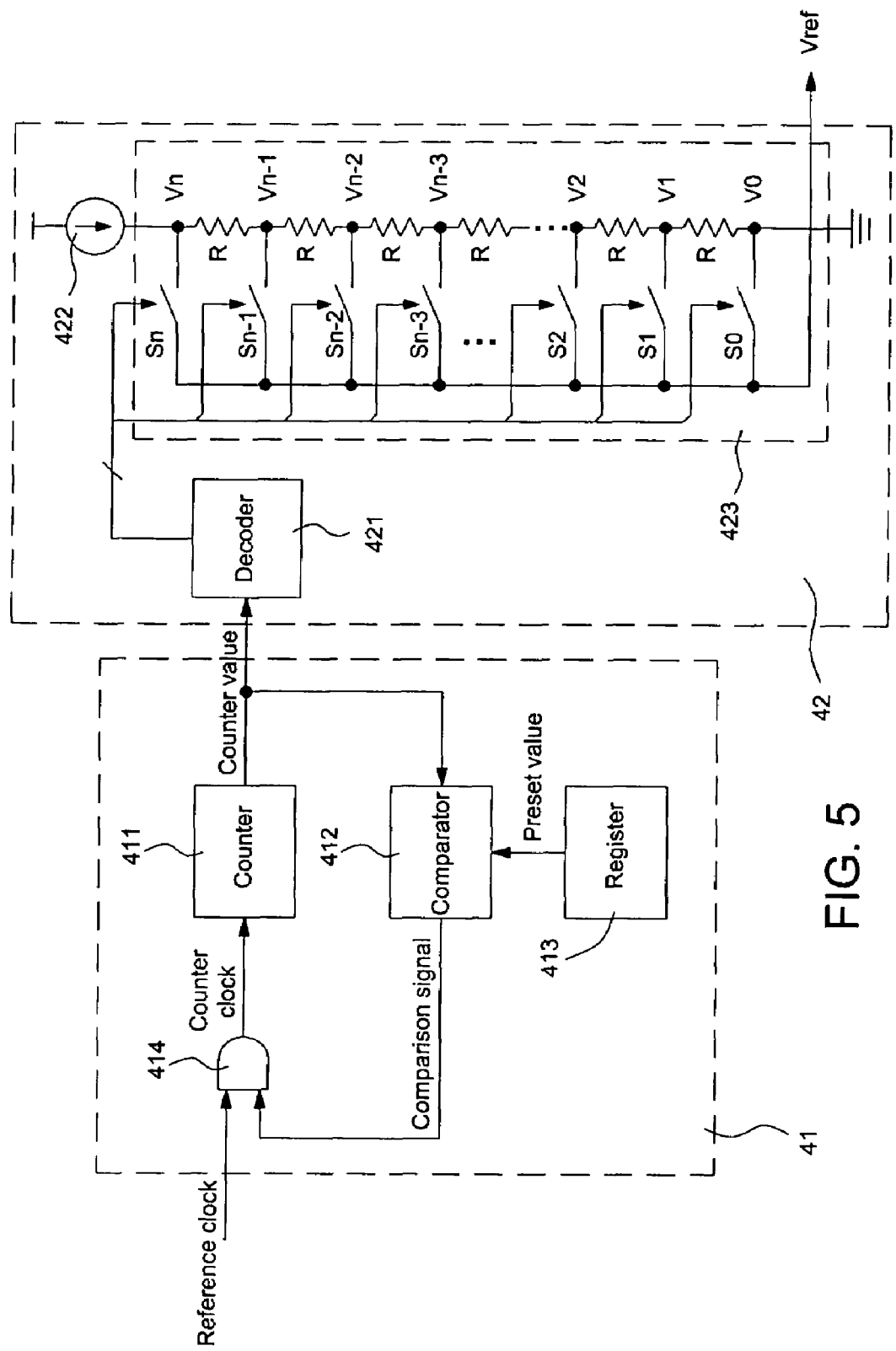
FIG. 5 shows a block diagram illustrating the detail of an embodiment of a reference voltage generator according to the present invention.

Referring to FIG. 5, the DAC 42 includes a decoder 421, a current source 422 and a variable resister 423. In one embodiment, the variable resistor 423 may include a plurality of serially coupled resisters R and their respective switches S0-Sn to provides variable voltage levels V0~Vn. After the DAC 42 receives the counting value, the counting value is decoded by the decoder 421 to become switch control signals, which control the switches S0-Sn of the variable resistor 423. Hence, the one of the voltage levels V0~Vn is selected according to the switch control signals to output as the reference voltage Vref.

Since the reference voltage generator 302 is built within the control chip 304, the off-chip capacitor is no longer needed for the switching voltage regulation device 300, and additional pins on the control chip 304 used to connect the off-chip capacitor are eliminated to save chip area. Also, the accuracy of the serially coupled resistors built inside the control chip 304 may be improved by means of the control of fabrication parameters. Further, the reference voltage Vref varying with time may be adjusted by the reference clock frequency of the reference voltage generator 302 and the counter 411.

While the invention has been described by way of examples and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A switching regulator, comprising:
   a reference voltage generator for receiving a digital control signal and generating a reference voltage according to the digital control signal; and
   a switching-regulating module connected to the reference voltage generator for generating am output voltage according to the reference voltage;
   wherein the digital control signal is generated by a logic control unit, and the logic control unit comprising:
      a counter for receiving a counting clock and generating a counting value used as the digital control signal:
      a comparator for comparing the counting value and a preset value to generate a comparison signal; and
      a logic gate for receiving a reference clock and the comparison signal and generating the counting clock.

2. The switching regulator as claimed in claim 1, wherein the value of the digital control signal is gradually increased to make the reference voltage be gradually increased at the initial stage of the activation of the switching regulator.

3. The switching regulator as claimed in claim 1, wherein the reference voltage generator is a digital-to-analog converter.

4. The switching regulator as claimed in claim 1, wherein the switching-regulating module comprises:
   a first comparator connected to the reference voltage generator for comparing the reference voltage with the output voltage to generate an error signal;
   a second comparator connected to the first comparator for comparing the error signal with a periodic signal to generate a pulse signal;
   a gate driver for generating a drive signal according to the pulse signal; and
   a switching unit for generating a current signal according to the drive signal.

5. A switching regulator, comprising:
   a logic control unit for generating a digital control signal;
   a digital-to-analog converter for receiving the digital control signal and generating a reference voltage; and
   a switching-regulating module connected to the digital-to-analog converter for generating an output voltage according to the reference voltage;
   wherein the logic control unit comprising:
   a counter for receiving a counting clock and generating a counting value used as the digital control signal;
   a comparator for comparing the counting value and a preset value to generate a comparison signal; and
   a logic gate for receiving a reference clock and the comparison signal and generating the counting clock;
   wherein the level of the counting clock is fixed when the counting value is larger than the preset value.

6. The switching regulator as claimed in claim 5, wherein the value of the digital control signal is gradually increased at the initial stage of the activation of the switching regulator.

7. The switching regulator as claimed as claim 5, wherein the switching-regulating module comprises:
   a first comparator connected to the digital-to-analog converter for comparing the reference voltage mid the output voltage to generate an error signal;
   a second comparator connected to the first comparator for comparing the error signal and a periodic signal to generate a pulse signal;
   a gate driver for generating a drive signal according to the pulse signal; and
   a switching unit for generating a current signal basing on the control of the drive signal.

8. The switching regulator as claimed in claim 5, wherein the logic control unit further comprises a register for storing the preset value.

9. A reference voltage generator for outputting a reference voltage to a switching-regulating module, comprising:
   a logic control unit for generating a digital control signal; and
   a digital-to-analog converter connected to the logic control unit for generating the reference voltage according to the digital control signal;
   wherein the logic control unit comprises:
   a counter for receiving a counting clock and generating a counting value used as the digital control signal;
   a comparator for comparing the counting value and a preset value to generate a comparison signal; and
   a logic gate for receiving a reference clock and the comparison signal and generating the counting clock;
   wherein the level of the counting clock is fixed when the counting value is larger than the preset value.

10. The reference voltage generator as claimed in claim 9, wherein the value of the digital control signal is gradually increased at the initial stage of the activation of the switching-regulating module.

11. The reference voltage generator as claimed in claim 9, wherein the logic control unit comprises a register for storing the preset value.

12. A reference voltage generator for outputting a reference voltage to a switching-regulating module, comprising:
   a logic control unit for generating a digital control signal;
   a digital-to-analog converter connected to the logic control unit for generating the reference voltage according to the digital control signal;
   wherein the digital-to-analog converter comprises, a current source, and a variable resistor module, and the resistance of the variable resistor module is adjusted according to the digital signal; and
   wherein the digital control signal is generated by said logic control unit, and the logic control unit comprising:
   a counter for receiving a counting clock and generating a counting value used as the digital control signal;
   a comparator for comparing the counting value and a preset value to generate a comparison signal; and
   a logic gate for receiving a reference clock and the comparison signal and generating the counting clock.

13. The reference voltage generator as claimed in claim 12, wherein the digital-to-analog converter further comprises a decoder.

14. The switching regulator as claimed in claim 1, wherein the level of the counting clock is fixed when the counting value is larger than the preset value.

* * * * *